Nov. 8, 1949     C. C. ANTHES     2,487,089
FLUID PRESSURE REGULATOR
Filed Sept. 14, 1944
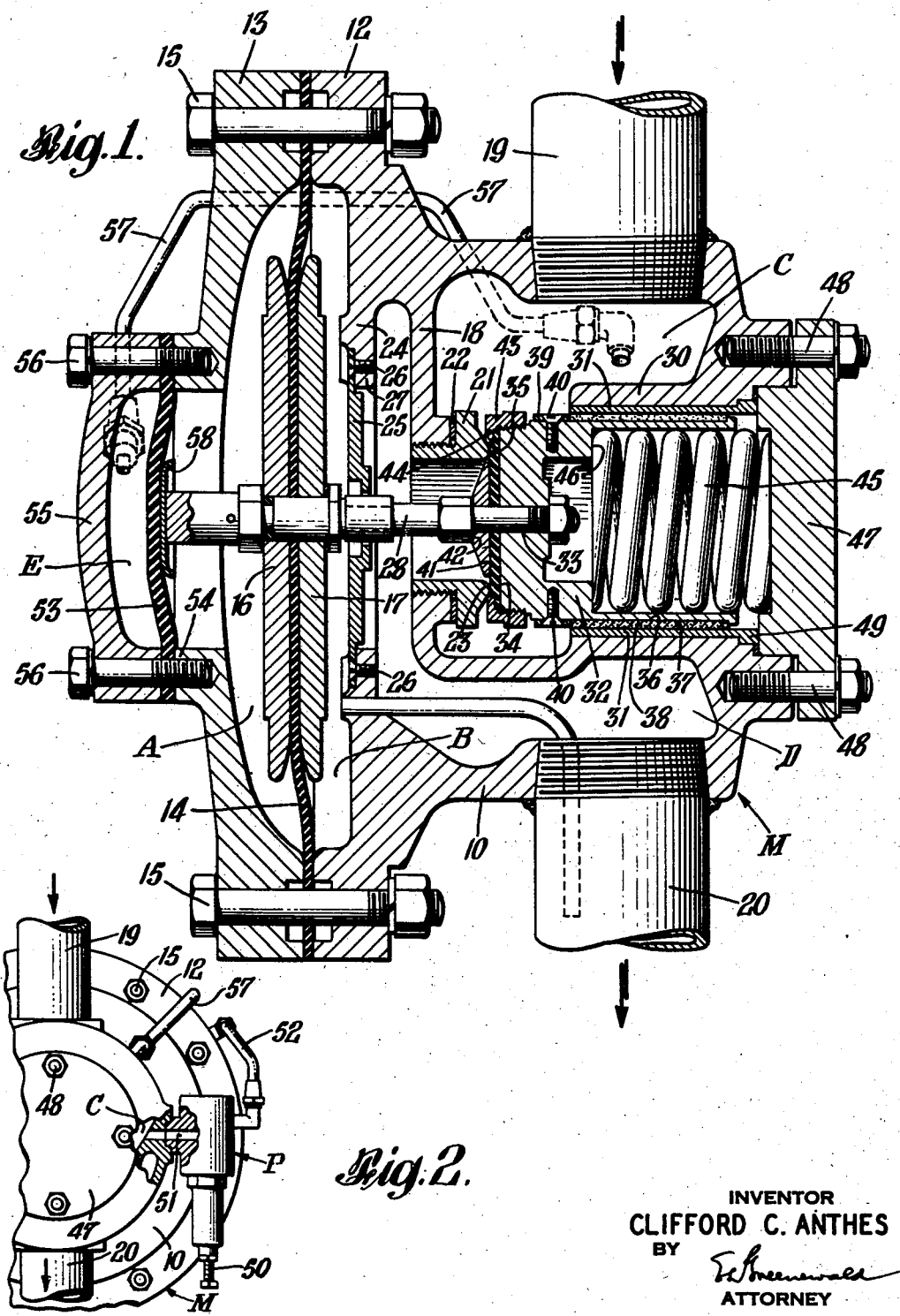
INVENTOR
CLIFFORD C. ANTHES
BY
ATTORNEY Patented Nov. 8, 1949

2,487,089

UNITED STATES PATENT OFFICE 2,487,089

FLUID PRESSURE REGULATOR

Clifford C. Anthes, Union, N. J., assignor to The Linde Air Products Company, a corporation of Ohio Application September 14, 1944, Serial No. 554,041

8 Claims. (Cl. 50—20)

This invention relates to fluid pressure regulators of the type in which a pilot regulator is adapted to control a main regulator for delivering a fluid at a substantially constant pressure, and more particularly to devices of this character of large size and high capacity, which are subjected to high inlet pressures and are required to deliver large volumes of fluid, such for example as are desired for supplying oxygen to apparatus consuming large quantities thereof, such as desurfacing machines and the like.

In the use of thermochemical desurfacing machines in steel mills and other installations, large pressure differentials and flow variations are encountered in the gas supplied to such machines, and the gas delivery pressure from the regulator has not been constant, but has been subject to variation dependent upon variations in the inlet pressure of the gas. When the oxygen for such machines is supplied to the regulator from a cold converter, the variation in inlet pressure supplied sometimes involves a difference of as much as 100 pounds per square inch.

It is therefore the main object of the present invention to render the delivery pressure of a fluid pressure regulator of this character more nearly constant, and materially less affected by changes in the inlet pressure of the fluid supplied to the regulator.

The pilot regulator employed receives this variable inlet pressure, and supplies fluid at a controlled pressure to act upon a diaphragm in the main regulator to open its valve. But, the inlet pressure is not controlled, so that the variable pressure acts upon the effective valve opening area, and acts in opposition to the controlled fluid pressure acting upon the main diaphragm in the main regulator. Thus, when the inlet pressure varies, causing a change in closing force on the valve, an opposing and equal change in force must be applied to act on the main regulator diaphragm to open the valve in order to maintain a constant delivery pressure from the regulator.

It is therefore a more specific object of the invention to prevent the uncontrolled variable inlet pressure acting to close the regulator valve. This is accomplished by applying the variable inlet pressure on a compensating or auxiliary diaphragm which acts to open the valve. The effective area of the compensating diaphragm is roughly the same as the effective valve opening area, therefore, the opposing forces acting upon the regulator valve as a result of the variable inlet pressure are equal and cancel out and it is possible to maintain the desired constant delivery pressure.

According to the present invention the force exerted on the head or upstream side of the regulator valve by the varying inlet pressure is cancelled or balanced by an equal force exerted on the downstream side of the valve by applying the same varying inlet pressure simultaneously to a compensating or auxiliary diaphragm.

Other objects are to simplify and improve the construction, and to facilitate and expedite the operation, of pressure regulators of this character, in addition to such further objects as will become apparent as the following description proceeds, with reference to the accompanying drawing, in which:

Fig. 1 is a diametral cross section through a pressure regulating valve according to the preferred embodiment of the present invention; and Fig. 2 is a partial front elevation of the structure shown in Fig. 1, parts being broken away and shown in section to expose the internal construction.

Referring more particularly to the drawings, the main regulator M comprises a casing 10, which is provided with an annular flange 12 adapted to receive a cover 13. A main pressure responsive element for resilient diaphragm 14, preferably of rubber, is positioned between the flange 12 and the bonnet or cover 13, and clamped therebetween by a series of cap screws 15 passing through the same. The margin of the diaphragm 14 is thereby compressed and effects a gas-tight seal between the opposed surfaces of the flange 12 and the cover 13, forming an outer chamber A on one side of the diaphragm 14 and an inner chamber B on the other side thereof. The central area of the diaphragm 14 is supported by backing plates 16 and 17 engaging its opposite sides, and clamping the central area of the diaphragm between them.

The casing 10 is provided with an internal partition 18 which sub-divides the body into two chambers C and D. The chamber C receives a high pressure inlet pipe 19 and constitutes a high pressure or inlet chamber while the chamber D discharges into an outlet pipe 20 and constitutes a low pressure or delivery chamber.

Mounted in a suitable central aperture in the partition 18 is a stationary nozzle or valve port 21 which provides a connecting passageway between the chambers C and D. The member 21 may be a nipple threaded into the partition aperture and having an external flange engaging a suitable gasket 22. The outer end of this nozzle or valve port member 21 is tapered to provide an annular rim to form a stationary valve element or seat 23.

A second partition 24 separates the inner chamber B from the chamber D. For coring purposes the central area of the partition 24 is formed by a separate plate 25, which is secured by screws 26 to an annular flange 27 extending inwardly from the casing 10. The plate 25 has a central aperture through which passes a valve actuating stem 28.

Extending inward from the opposite end of the body 10 is an internal cylindrical boss 30 integral with the partition 18 and receiving a cylindrical liner 31 which is axially in line with the nozzle 21, the inner ends of the boss and liner being spaced from the valve seat 23 to provide an annular fluid passageway therebetween. A movable valve element or piston 32 is adapted to reciprocate within the liner 31 or guide for the movable valve element 32, and the head of this piston has an axial bore 33 adapted to receive the valve stem 28. The piston head also has an end surface 34 which serves as a backing for a resilient valve facing 35 adapted to cooperate with the valve seat 23. The liner 31 has a smooth bore of constant diameter arranged coaxial with but spaced from the port provided by the nozzle 21, and the head of the piston 32 projects outside that end of the bore of the liner 31 which is nearer to the valve seat 23.

The valve actuating stem 28 extends axially through both the port and the valve facing 35 and is secured to the piston 32 to actuate the latter and the valve facing 35 carried thereby. The piston 32 has a skirt 36 formed with a long shallow recess to provide an elongated peripheral portion 37 thereon of slightly smaller diameter than the bore of the liner 31. An annular thin wall anti-friction sleeve 38 of non-metallic material, for example, a phenol-formaldehyde synthetic resin material containing 18% of graphite, surrounds and is internally supported by the cylindrical surface portion 37, and abuts at one end against said annular shoulder so that the external surface of the sleeve 38 slidably contacts the internal surface of the bore of the liner 31. The anti-friction sleeve 38 preferably is split longitudinally for convenience in assembly, and is held in position on the piston 32 and against the peripheral annular shoulder thereof by an annular ring 39 secured to the skirt of the piston near the head thereof by machine screws 40.

The central portion of the facing 35 within the seat 23 is held in place by a washer 41 which engages a shoulder 42 on the stem 28. The margin of the facing 35 outside of the seat 23 is clamped onto the end of the piston by a ring 43 threaded onto the head of the piston, and having an inwardly directed flange 44 overhanging the margin of the facing 35. The skirt 36 of the piston is adapted to receive a valve closing spring 45, which bears against an internal shoulder 46 between the head and skirt. The other end of the spring 45 bears against a cover plate 47 which is suitably gasketed, and secured in position on the casing by studs 48. The cover 47 also serves to hold the liner 31 in position, with an external flange 49 of the liner abutting against a suitable annular shoulder in the boss 30.

As shown in Fig. 2, a pilot regulator P is associated with the main regulator M and is in general preferably similar to that shown in Smith and Jacobsson Patent No. 2,146,273. The pilot regulator P is set for the desired value of constant delivery pressure by means of a screw 50. A connecting passage 51 connects the high pressure chamber C of the main regulator M to the high pressure chamber of the pilot regulator P. The controlled pressure from the pilot regulator P is transmitted to the main regulator chamber A by a tube 52.

In operation, high pressure fluid such as oxygen, usually at a pressure of the order of 250 pounds per square inch or less, enters the inlet chamber C of the main regulator M through the inlet pipe 19. The spring 45 ordinarily maintains the valve 23 closed, and prevents the incoming fluid from proceeding further. But the passage 51 transmits the pressure of the incoming fluid to the pilot regulator P. The pilot regulator in turn transmits controlled pressure through the tube 52 to the chamber A of the main regulator. This controlled pressure is thus exerted on the main diaphragm 14, which acting through the valve stem 28, opens the main regulator valve 32 causing the gas to pass into the outlet chamber D and thence to the outlet passage 20. When sufficient pressure has been developed in the chamber D, which is transmitted to the chamber B through the central aperture in the plate 25, the diaphragm 14 is forced outwardly permitting the valve closing spring 45 to close the main valve 23.

It will be noted that through the slot in the sleeve 38 or other leakage, the pressure in the chamber D is transmitted into the interior of the piston 32, with the result that the variable and uncontrolled inlet pressure acts upon the effective area of the valve seat 23 to oppose opening the valve. To compensate for this pressure, an auxiliary pressure responsive element or a second diaphragm 53 is provided, which is smaller than the main diaphragm 14 and is clamped between a rim 54 which extends around a central aperture in the cover 13, and the margin of a cap 55 which is secured to the rim 54 by machine screws 56. The diaphragm 53 and cap 55 define a compensating chamber E, which is connected by a tube 57 with the inlet pressure supplied by the inlet pipe 19. The opposite side of the diaphragm 53 toward the valve stem 28 engages an enlarged head or bearing member 58 carried by the end of the valve stem 28. The diaphragm 53 is preferably of rubber or other suitable gas impervious resilient material and the diaphragm and the chamber E are so dimensioned, that the effective area of the diaphragm 53 is equal to the area of the valve seat 23. In this manner the pressure in the chamber E balances the pressure acting on the inside of the piston 32.

What is claimed is:

1. In a fluid pressure regulator apparatus having a pilot regulator and a main regulator, said main regulator comprising a casing having an inlet and a high pressure fluid chamber receiving fluid from said inlet, and a low pressure chamber having a delivery outlet, a valve between said chambers; means for operating said valve comprising a valve stem, a piston secured to the end of said valve stem; a diaphragm mounted intermediate the ends of said valve stem and a spring housed in said piston for opposing the action of said diaphragm, means for applying pressure from said pilot regulator to the side of said diaphragm away from said spring, means for applying delivery pressure to the side of said diaphragm toward said spring, said valve stem being mounted on said diaphragm for opening said valve; a compensating diaphragm having an effective area equal to that of the valve port and coaxial with said first diaphragm and engaging said valve stem at the end opposite from said piston; and means for applying inlet pressure to the side of said compensating diaphragm away from said first diaphragm.

2. In a fluid pressure regulator apparatus having a pilot regulator and a main regulator comprising a casing, a partition in said casing dividing the same into chambers, one of said chambers having an inlet for high pressure fluid and the other having a delivery outlet for low pressure fluid, a nozzle in said partition for establishing communication between said chambers, a valve for closing said nozzle having a valve stem and a piston, a spring housed in said piston for urging said valve into closing position, said stem being mounted for opening said valve against the action of said spring, a main diaphragm mounted intermediate the ends of said stem for actuating said valve stem, means for applying pressure from said pilot regulator to the side of said main diaphragm away from said valve, means for applying delivery pressure to the side of said diaphragm toward said valve, a compensating diaphragm of smaller diameter than said main diaphragm and having an effective area equal to that of the nozzle mounted coaxially with said main diaphragm and engaging said valve stem at the end thereof opposite from said piston, and means for applying inlet pressure to the side of said compensating diaphragm away from said valve stem.

3. In a fluid pressure regulator comprising a casing provided with a high pressure chamber communicating with a fluid inlet for fluid at a variable high pressure, a low pressure chamber communicating with a fluid outlet and a nozzle connecting said chambers; a valve to control fluid flow through said nozzle, said valve including in the high pressure chamber a seat and a cooperating piston and a spring urging the head of said piston against such seat, in the low pressure chamber a main diaphragm and a compensating diaphragm, and a valve stem operatively connecting said diaphragms and said head; the improvements which comprise a partition disposed between said nozzle and said main diaphragm, means securing said main diaphragm to said valve stem intermediate its ends and means for supplying controlled high pressure fluid to said main diaphragm for opening said valve, means securing one end of said valve stem to said piston head, said compensating diaphragm being imperforate and having an effective area equal to that of said nozzle, means for supplying said variable high fluid pressure thereto and an enlarged bearing member on the other end of said stem engaging said compensating diaphragm.

4. Fluid pressure regulator according to claim 3 wherein the compensating diaphragm, main diaphragm, partition, nozzle, piston, and spring are axially aligned in the order named.

5. Fluid pressure regulator according to claim 3 in which a resilient facing is secured to said piston head and a rigid ring is provided for clamping the margin of said facing to said piston head.

6. Fluid pressure regulator according to claim 3 which includes a pilot regulator mounted on said casing and means for applying controlled pressure from said pilot regulator to the side of said main diaphragm away from said nozzle.

7. In a fluid pressure regulator comprising a casing provided with a high pressure chamber communicating with a fluid inlet for fluid at a variable high pressure, a low pressure chamber communicating with a fluid outlet and a nozzle connecting said chambers; a valve to control fluid flow through said nozzle, said valve including in the high pressure chamber a seat, a cylinder, a piston slidable in said cylinder and cooperating with said seat and a spring housed in said cylinder urging the head of said piston against said seat, in the low pressure chamber a main diaphragm and a compensating diaphragm, and a valve stem operatively connecting said diaphragms and said piston head; the improvements which comprise a partition disposed between said nozzle and said main diaphragm, means securing said main diaphragm to said valve stem intermediate its ends and means for supplying controlled high pressure fluid to said main diaphragm for opening said valve, said compensating diaphragm being imperforate and means for supplying said variable high fluid pressure thereto, an enlarged bearing member on the end of said stem opposite said piston and engaging said compensating diaphragm, said cylinder having a liner therein and alined with said nozzle, said piston having a skirt formed with a recess, an anti-friction sleeve surrounding said skirt and extending radially out of said recess for slidably contacting the internal surface of the bore of said liner.

8. In a fluid pressure regulator having an enclosing casing provided with a high pressure inlet chamber, an inlet for said inlet chamber, a low pressure discharge chamber, an outlet for said low pressure discharge chamber, a valve having a stationary element and a movable element and located between said chambers, a main diaphragm for the regulator clamped adjacent an end of the casing and exposed on one side to the pressure in the discharge chamber, a valve stem between said main diaphragm and said movable valve element, a guide for directing movement of said movable valve element, and a bonnet on a side of said diaphragm opposite said valve, whereby said diaphragm may be loaded, the combination therewith of the improvement for rendering the movements of the movable valve element independent of variations in pressure in said high pressure inlet chamber, said improvement comprising an auxiliary diaphragm in cooperation with said valve stem and spaced from the main diaphragm on the side of the main diaphragm opposite said valve, a removable cap secured to said bonnet and clamping said auxiliary diaphragm to said bonnet, and a tube connecting said cap with the inlet pressure, said auxiliary diaphragm having an effective area substantially equal to that of said movable element valve.

CLIFFORD C. ANTHES.

REFERENCES CITED

The following references are of record in the file of this patent:

UNITED STATES PATENTS

| Number | Name | Date |
|---|---|---|
| 238,359 | Cowan | Mar. 1, 1881 |
| 352,382 | Westinghouse | Nov. 9, 1886 |
| 815,912 | Eddy | Mar. 20, 1906 |
| 2,082,223 | Smith | June 1, 1937 |
| 2,146,273 | Smith | Feb. 7, 1939 |

FOREIGN PATENTS

| Number | Country | Date |
|---|---|---|
| 270,381 | Great Britain | May 3, 1927 |

Certificate of Correction

Patent No. 2,487,089                                                    November 8, 1949

CLIFFORD C. ANTHES

It is hereby certified that errors appear in the printed specification of the above numbered patent requiring correction as follows:

Column 2, line 28, for the words "element for" read *element or*; column 6, line 56, for "element valve" read *valve element*;

and that the said Letters Patent should be read with these corrections therein that the same may conform to the record of the case in the Patent Office.

Signed and sealed this 11th day of April, A. D. 1950.

[SEAL]

THOMAS F. MURPHY,
*Assistant Commissioner of Patents.*